United States Patent [19]
Bard et al.

[11] Patent Number: 4,641,985
[45] Date of Patent: Feb. 10, 1987

[54] TEMPORARY EDGE TO EDGE SECUREMENT IN SPACE OF TWO PARTS

[75] Inventors: Max Bard, Cannes; Gérard Sibilo, Le Plan de Grasse; Georges Marello, Mandelieu; Daniel Viale, Fayence; Michel Louis, Nice, all of France

[73] Assignee: Aerospatiale Societe Nationale Industrielle, Paris Cedex, France

[21] Appl. No.: 739,858

[22] Filed: May 31, 1985

[30] Foreign Application Priority Data

Jun. 5, 1984 [FR] France ............... 84 08783

[51] Int. Cl.$^4$ .......................... F16B 1/04
[52] U.S. Cl. ........................ 403/16; 403/13; 403/336; 403/381; 403/331; 220/4 F; 244/173
[58] Field of Search ............ 403/381, 364, 331, 338, 403/335, 336, 13, 16, 14, 341; 220/4 F, 319, 4 B, 4 E; 108/89; 244/173

[56] References Cited

U.S. PATENT DOCUMENTS

| | | | |
|---|---|---|---|
| 3,091,487 | 5/1963 | Gallagher et al. | 287/130 |
| 3,677,508 | 7/1972 | Dillard et al. | 244/173 |
| 3,820,477 | 6/1974 | Griffin | 108/80 |
| 3,995,685 | 12/1976 | Stanko | 164/386 |
| 4,102,529 | 7/1978 | Neblung et al. | 403/381 X |
| 4,350,257 | 9/1982 | Groth et al. | 220/4 F |
| 4,426,053 | 6/1984 | Chenin et al. | 220/315 X |

FOREIGN PATENT DOCUMENTS

| | | |
|---|---|---|
| 2252093 | 5/1974 | Fed. Rep. of Germany . |
| 2398663 | 2/1979 | France . |
| 2501155 | 9/1982 | France . |

*Primary Examiner*—Cornelius J. Husar
*Assistant Examiner*—Joseph A. Fischetti
*Attorney, Agent, or Firm*—Browdy and Neimark

[57] ABSTRACT

A device for temporary edge to edge securement in space of two parts along a contacting surface comprising:

a plurality of retaining members distributed in pairs on either side of such contacting surface on each of said respective parts and a plurality of temporary connection members adapted to maintain them coupled to one another, with the rataining members in each pair being provided with complementary raised members for retainment thereof one relative to the other according to a longitudinal direction parallel to said contacting surface in at least one direction, said retaining members in each pair forming conjointly a bulging tenon oriented longitudinally engaging a narrowing groove formed in a rider constituting a temporary connection member for such pair of retaining members, and an automatic release mechanism comprising a coordination element connected to the plurality of temporary connection members and adapted to disengage the latter relative to said plurality of retaining members under the action of an opening mechanism.

10 Claims, 6 Drawing Figures

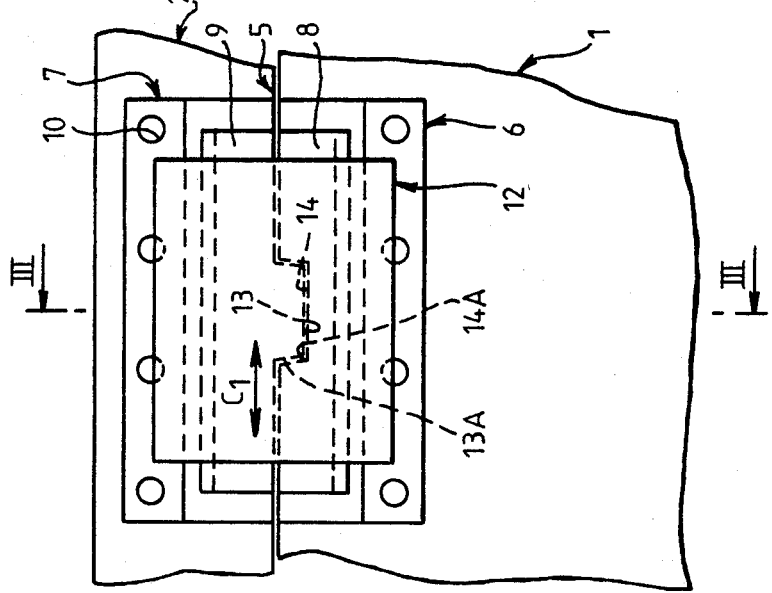
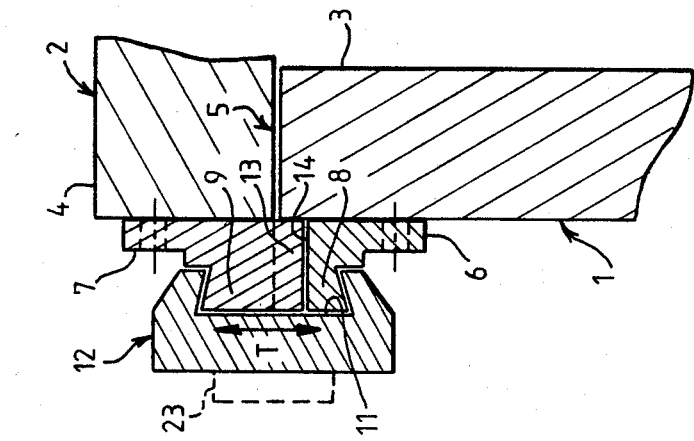

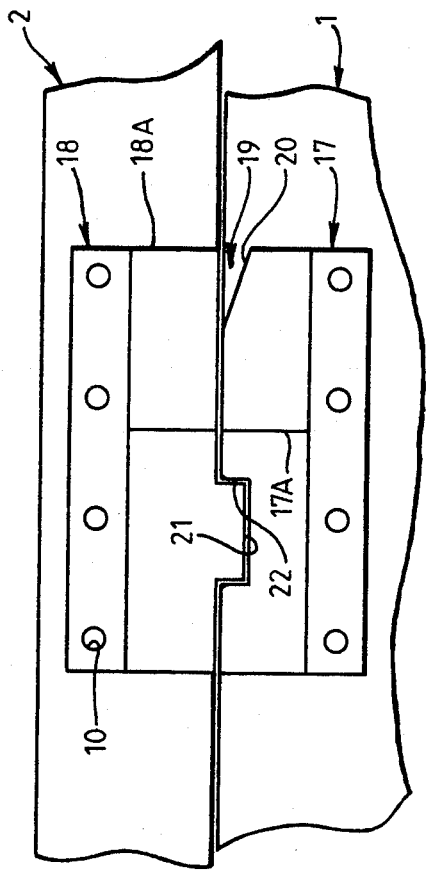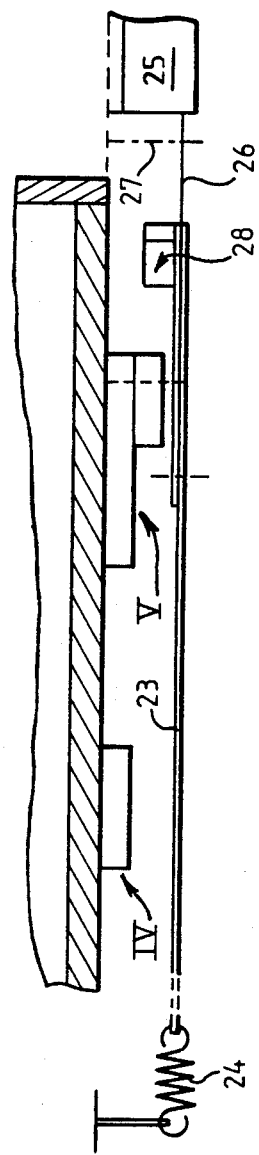

TEMPORARY EDGE TO EDGE SECUREMENT IN SPACE OF TWO PARTS

FIELD OF THE INVENTION

This invention relates to a device for temporary edge to edge securement in space of two parts such as used among other things for temporary closing of space containers for example for temporary storage of solar panels that should be spread out only after orbiting a carrier satellite.

BACKGOUND

As is known, such space containers are generally constituted by a hollow body, for example a parallelepiped, closed by at least one cover, and the temporary securement devices of their constituent parts comprise an automatic release mechanism for permitting or even causing separation of such parts in response to commands to cause the opening to take place prior to spreading out the contents of such containers.

Mainly the following devices have been known until now as mechanisms for opening space containers:

there has already been proposed such a device comprising a series of supple hooks made fast with either one of the secured parts and adapted to be disengaged from the complementary part under the effect of a cam actuated by an opening command. In its conventional form such device is not designed to pass the shearing forces appearing in applications implying large cantilevers;

the patent DE No. 28 32 306 (or GB No. 31400-77) describes on its part a closing system for a supple housing containing a solar generator. Said housing cannot pass shearing forces and the closing system only comprises riders which hold in overlapping position the lugs of each pair of straps, each connected to an edge of the supple housing. A flexible guided blade causes simultaneous opening under the action of a pyrotechnical jack;

the U.S. Pat. No. 4426053 in the Assignee's name permits on the other hand to pass significant shearing flux by means of a connection provided by sheet metal elements welded to plates assembled onto the structure and the container cover. The opening is ensured due to the action of a spring which causes the welded connections to peel off by lifting them at one end thereof. An essential difficulty in this solution is however the realization and reproducibility of the welding of the sheet metal elements to the plates.

SUMMARY

The object of this invention is a device for temporary edge to edge securement of two parts such as for example, two parts of a space container which is adaptable to transmit between such parts, in addition to forces for maintaining contact, shearing forces in the plane of their contacting surface while permitting automatic reliable release of such parts with respect to one another in response to an opening command; the object of the invention is more particularly a device of the mentioned type which is adapted to be utilized in a severe environment of the space vacuumtype, wherein mechanical structures are currently submitted to very strong temperature gradients or even brutal temperature variations within wide ranges depending on their orientation to the sun. The object of the invention is also to optimize the geometry of the contacting surfaces between the parts to be secured so as to reduce relative plays therebetween to minimum.

To this end, there is generally proposed according to the invention a device for temporary edge to edge securement in space of two parts along a contacting surface of the type comprising retaining members distributed in pairs on both sides of such contacting surface on each of said parts respectively and temporary connection members to maintain the retaining members in each pair in a coupled position, as well as an automatic release mechanism comprising a coordination element connected to the temporary connection members and adapted to disengage the latter relative to the retaining members under the action of an opening mechanism, characterized in that the retaining members in one and the same pair are provided with complementary raised portions for retainment to one another according to a longitudinal direction parallel to the contacting surface of said parts, at least in one direction, and in that such retaining members conjointly form a longitudinally oriented bulging tenon engaged in a narrowing groove formed in a rider constituting a temporary connection member.

The invention teaches more particularly that the bulging tenon and the narrowing groove should be in a dovetailed configuration.

The edge to edge securement of two parts by means of a rider brought to engage a longitudinal bulging tenon is known in itself mainly according to U.S. Pat. Nos. 3091487 and 3995665, but none of these patents describes or suggests combining such riders with an automatic release mechanism. Only the first of these documents proposes to retain longitudinally both parts one relative to the other but such retainment is provided by the rider itself which therefore cannot be combined with a release mechanism for obtaining longitudinal disengagement relative to the associated bulging tenon. Such documents do not relate to the space field.

The shape of the complementary raised portions for longitudinal retaining in a device according to the invention can be subject to many variations depending on the considered applications. In its general form a device according to the invention ensures transmission in both directions of longitudinal shearing forces provided that successive pairs of opening retaining members present complementary longitudinal retaining raised members adapted to act in opposed directions. The invention however recommends that the complementary raised members in each pair should be able to provide longitudinal retaining in both directions. Such raised members may consist of undulations or a succession in broken line of inclined sides. The invention however contemplates that such raised members should consist of a tenon and a mortise with substantially parallel flanks preferably having however an inclination of a few degrees to facilitate separation thereof.

The riders in a device according to the invention ensure in conjuction with the associated retaining members the transmission of transverse shearing forces between the secured parts perpendicularly to the orientation of the tenons and mortises. It is also proposed according to the invention to provide additional raised members formed opposite to one another along the contacting surface of the secured parts for their transverse shearing retaining. The raised members can be combined with the above mentioned longitudinal retaining raised members. It is proposed however according to the invention that such transverse retaining raised members should be interspersed along the contacting surface between pairs of retaining members to provide, as much as possible in a continuous manner, transverse retaining of the parts all along their contacting surface. Such raised members are advantageously bevelled.

It is also proposed according to the invention that the coordination member connected to the riders for disengagement thereof at the proper time should be also connected to a spreader for example consisting of a knife, with at least one notch being formed longitudinally near contacting surface of both parts so as to ensure by cooperation with the spreader, forced spreading apart of the parts after the connecting members have been disengaged from the retaining members.

For the skae of simplicity, the invention teaches that the retaining members as well as the transverse retaining raised members are formed on added on plates of the parts to be temporarily secured to one another. In this way, a temporary closing device can be assembled and then fixed as a whole to the parts to be secured and the assembling steps for such device and the parts to be secured are therefore simplified and facilitated.

BRIEF DESCRIPTION OF DRAWING

Other objects, characteristics and advantages of this invention will appear from the following description which is given by way of non limitative example in reference to the attached drawings in which:

FIG. 2 is an enlarged view of a detail of FIG. 1 as designated by the arrow II;

FIG. 3 is a cross-sectional view thereof according to line III—III of FIG. 2;

FIG. 4 is an enlarged cross-sectional view of the detail of FIG. 1 designated by arrow IV;

FIG. 5 is an enlarged view of the detail of FIG. 1 designated by arrow V, and

FIG. 6 is a top view according to the arrow VI of the lower portion of FIG. 1 after enlargement.

DETAILED DESCRIPTION OF EMBODIMENTS

Figure 1:
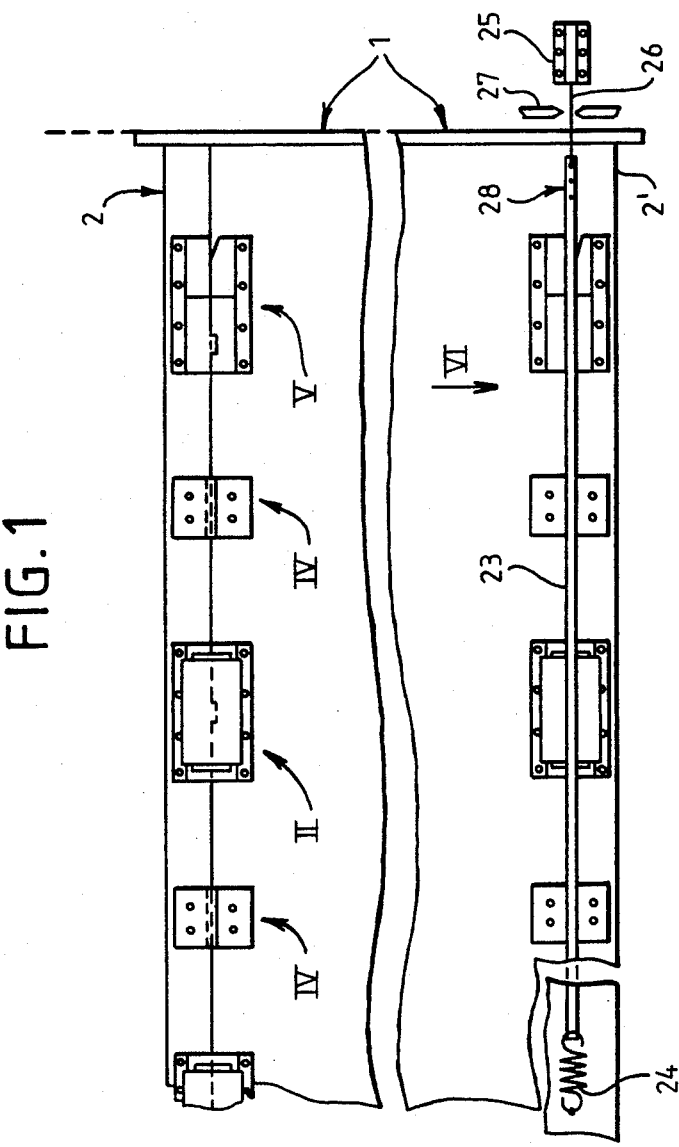
FIG. 1 is a partial lateral view of a space container provided with two temporary securement devices according to the invention.

FIGS. 1 to 6 illustrate by way of example a temporary securement device according to the invention as applied to the temporary closing of a space container formed from a hollow body 1 generally rectangular and closed by two covers 2 and 2'.

A substantially complete device according to the invention is represented in the lower section of FIG. 1 and in FIG. 6, whereas the upper section of FIG. 1 represents a similar device after removal of the associated automatic release mechanism.

The temporary securement devices represented by way of example in FIG. 1 mainly comprise, for edge to edge securement of covers 2 and 2' to the body 1, connecting assemblies of the type designated by arrow II in FIG. 1 and represented in detail in FIGS. 2 and 3.

Such a connecting assembly is mounted so as to ride on respective edges 3 and 4 of the body of container 1 and of cover 2 joined according to a contacting surface 5. Such edges define a continuous outer surface to which two retaining members 6 and 7 are mounted defining conjointly a bluging tenon of two joined portions 8 and 9.

In the illustrated example such members 6 and 7 are provided with bores 10 therein so as to be attached in particular by means of screws to the edges 3 and 4 of the parts to be secured to one another.

The bulging tenon in the example shown has a dovetailed configuration and trapezoidal cross-section; it engages into a narrowing groove 11 formed in a rider 12 which, acting upon the retaining members 6 and 7, provides for edge to edge maintaining of parts 1 and 2 against opening forces T perpendicular to the contacting surface 5 of both parts. In the example shown, the narrowing groove 11 is a dovetailed mortise.

The bulging tenon 8 and 9 and the groove 10 are oriented longitudinally parallel to the contacting surface 5 and the outer surface of the parts to be secured to one another.

For ensuring longitudinal retaining of such edges at least in one direction the retaining members 6 and 7 are formed with complementary raised members therein. In the example shown such raised members consist of a tenon 13 made integral with member 7 engaged in a mortise 14 formed in member 6. Such tenon and mortise are oriented transversely and provide longitudinal retainment of members 6 and 7 in both directions (shearing forces C1). Their flanks 13A and 14A are substantially perpendicular to the contacting surface 5 with preferably a slope of several degrees relative to T. It will be noted that in the example shown the retaining members 6 and 7 are joined according to a generally planar surface parallel to the contacting surface 5 of parts 1 and 2 and moreover, located in the extension of the latter.

In a variation not shown, the confronting surface of the retaining members provided or not with complementary tenon and mortise is inclined at least about a transverse axis and is preferably composed of a plurality of successive flaps of opposite inclinations so as to define on at least one of the members at least one projecting angle engaging a re-entrant angle defined in the other member.

A temporary securement device according to the invention generally comprises a plurality of connecting assemblies of the above-mentioned type distributed along the contacting surface 5. Between such assemblies there are advantageously disposed additional transverse retaining assemblies one of which is shown by way of example in FIG. 4.

The additional assembly shown in FIG. 4 consists of two plates or lugs 15 and 16 respectively added on to the edge 3 of body 1 and to the edge 4 of cover 2, facing each other according to two bevelled edge sections 15A and 16A. In the confronting configuration such edge portions advantageously intercept the extension of the contacting surface 5 of edges 3 and 4 so that one 15A of such edge portions engages a groove defined by the associated edge portions 16A and the edge carrying it. Such configuration permits transmission of transverse shearing forces in both directions between edges 3 and 4 (forces denoted C2).

In a modified form of embodiment, not shown, the confronting surfaces of the retaining members 6 and 7 are also bevelled.

It may be noted that due to the bringing into abutment of both portions 8 and 9 of the bulging tenon against the bottom of groove 11 the retaining members 6 and 7 and the rider 12 also ensure somehow and conjointly transverse retaining of edges 3 and 4.

The edge to edge securement device according to the invention which is represented by way of example also comprises advantageously a separation assembly illustrated in FIG. 5. It comprises two plates 17 and 18 respectively added on to the body of container 1 and to cover 2, confronted according to application surfaces substantially parallel to the contacting surface of the secured parts 1 and 2 but which spread out from one another in a longitudinal direction so as to define a spreading slot 19 the purpose of which will be explained hereinafter. In the example shown such slot is defined by a bevelled ramp 20 formed on only one 17 of the plates.

The slot 19 is advantageously formed in portions 17A and 18A of the plates which are of a higher transverse dimension than the connecting assemblies or the additional transverse retaining assemblies.

In the example shown such plates 17 and 18 interpenetrate one another with a tenon 21 in one plate 18 being engaged in a mortise 22 formed in the other plate 17.

In a modified form of embodiment not shown the plates 17 and 18 are also configured so as to define, as do members 6 and 7 of FIG. 2, a bulging tenon engaging a narrowing groove formed on a rider similar to part 12.

The plates 15 to 18 comprise, as do members 6 and 7, bores 10 therethrough for fixation thereof to the parts 1 and 2 to be secured to one another.

Apart from such assemblies as illustrated in FIGS. 2 to 5, a device according to the invention comprises a mechanical release mechanism partly represented in a top view in FIG. 6.

Such mechanism mainly comprises a coordination and transmission element 23 for example consisting of a rod or a blade connected to all of the riders 12 of the type shown in FIGS. 2 and 3 and adapted to disengage them relative to the associated retaining members under the action of a driving member 24 (carried by one or the other of the secured parts) in response to command to initiate opening.

In the example shown the driving member is a spring held under tension by a locking device 25 advantageously permitting adjustment of the tension connected to the coordination element by a cable 26 extending through an opening trigger member 27 for example of the type with a pyrotechnical command cable cutting means. The driving member, the locking device and the triggering member form together an opening mechanism.

The coordination element 23 also comprises advantageously a blade 28 to be engaged after the riders 12 have been released from the associated retaining members into the slot 19 of the separation assembly 17-18. Through a wedging effect such blade 28 therefore forces both parts 1 and 2 apart from one another despite any possible residual frictions resulting in particular from thermal or plastic deformations that may occur mainly at the various tenon and mortise connections.

In a modified form of embodiment not shown, the driving member is a motor for example of the pyrotechnical type.

The coordination member 23 advantageously engages guiding elements (not shown) adapted to provide sufficient longitudinal deviation of such element to permit relative disengagement of riders and retaining members while maintaining them laterally to prevent such element, the associated knife 28 or the riders 12 from interfering with the spreading out of the contents of the container or with other mechanical or optical elements of the structure to which the container is secured.

It will be understood that the above description was only proposed by way of illustration and that many variations can be suggested by the man of the art without departing from the scope of the invention. Thus, the frictional maintaining of the riders on the bulging tenons can be improved by configuring the riders and the tenons so that they have a monotonous variation in cross-section thereby to provide very good wedging in of the riders in the configuration for maintaining in contact the retaining members and easier disengagement of such riders as soon as they started to move relative to these retaining members. Similarly, the complementary raised members of the opening retaining members or transverse retaining members can comprise steps or even teats therein perpendicular to the contacting surface of the secured parts. Any number of devices can be utilized for temporary edge to edge securement of two determined parts together; when such number is higher than 1 the associated mechanical release mechanisms must however be synchronized with one another. The knife 28 is diposed advantageously but not obligatorily at one end of the coordination element 23; in a modified form of embodiment such element is provided at each end with knives oriented in the same direction.

It is to be noted that space containers in particular for storage of solar panels generally contain a pressurized bladder for maintaining suitably such panels near one another as much as possible in a rigid configuration. The presence of such bladder in a container designed according to the invention has the advantage of compensating for any plays between the retaining members and the associated rider, due to the increased pressure resulting between the flanks of the tenon formed by such members and the flanks in the groove of the rider (parallel to arrow T in FIG. 3). Such bladder is practically deflated before proceeding to the automatic release phase.

We claim:

1. A device for temporary edge to edge securement in space of two parts along a contacting surface comprising:
   a plurality of retaining members distributed in pairs on either side of such contacting surface on each of said respective parts and a plurality of temporary connection members adapted to maintain said retaining members coupled to one another in each pair, with the retaining members in each pair being provided with complementary raised members for retainment thereof one relative to the other according to a longitudinal direction parallel to said contacting surface on each of said respective parts in at least one direction, said retaining members in each pair forming conjointly a bulging tenon oriented longitudinally engaging a narrowing groove formed in a rider constituting a temporary connection member of such pair of retaining members, and an automatic release mechanism comprising a coordination element connected to the plurality of temporary connection members and adapted to disengage the latter through relative longitudinal movement between said connection members and said plurality of retaining members under the action of an opening mechanism.

2. A device according to claim 1, wherein the retaining members in each pair conjointly form a dovetailed tenon engaging a dovetailed groove formed in said rider.

3. A device according to claim 1, wherein the complementary raised members of the retaining members in each pair comprise flanks adapted to ensure longitudinal retainment thereof in both directions.

4. A device according to claim 3, wherein said complementary raised members comprise means for blocking sliding movement including a tenon with substantially parallel flanks engaging a mortise and oriented transversely to the contacting surface.

5. A device according to claim 4, wherein said flanks are substantially parallel and respectively present a relative inclination of a few degrees.

6. A device according to claim 1, wherein complementary raised members are provided along the contacting surface of the parts secured edge to edge to one another.

7. A device according to claim 6, wherein said complementary raised members are formed between two successive pairs of retaining members.

8. A device according to claim 6, wherein said complementary raised members are bevelled edge portions of two plates added on to the parts to be secured to one another, with one of such edge portions engaging a groove defined by the other edge portion and the associated parts.

9. A device according to claim 1, wherein the coordination element is an elongated element at the ends of which a spring under tension and a cable connected to a locking element and extending through a cable cutting element are respectively secured.

10. A device for temporary edge to edge securement of space of two parts along a contacting surface comprising:
a plurality of retaining members distributed in pairs on either side of such contacting surface on each of said respective parts and a plurality of temporary connection members adapted to maintain them coupled to one another, with the retaining members in each pair being provided with the retaining members in each pair being provided with complementary raised members for retainment thereof one relative to the other according to a longitudinal direction parallel to said contacting surface in at least one direction, said retaining members in each pair forming conjointly a bulging tenon oriented longitudinally engaging a narrowing groove formed in a rider constituting a temporary connection member for such pair of retaining members, and
an automatic release mechanism comprising a coordination element connected to the plurality of temporary connection members and adapted to disengage the latter relative to said plurality of retaining members under the action of an opening mechanism;
also comprising two plates joined by two edge portions opposite to one another, respectively fixed to each of the parts to be secured edge to edge to one another and defining a slot therein adapted to receive, for providing forced spreading of such parts, a knife secured to the coordination element of the automatic release mechanism so as to cooperate with said slot after the riders, also fixed to said coordination element, have been disengaged relative to the associated bulging tenons.

* * * * *